United States Patent [19]

Lang et al.

[11] 3,860,414

[45] Jan. 14, 1975

[54] USE OF GRAFT COPOLYMERS AS AGGLOMERATION BINDERS

[75] Inventors: William J. Lang, Libertyville; John J. Krajewski, Wheeling, both of Ill.

[73] Assignee: International Minerals & Chemical Corporation, Libertyville, Ill.

[22] Filed: Sept. 4, 1968

[21] Appl. No.: 757,471

[52] U.S. Cl. ................................... 75/3, 260/17 A
[51] Int. Cl. .......................... C08d 9/06, C21b 1/26
[58] Field of Search .......... 75/3, 4; 260/17 A, 41 B; 204/159.12, 160.1

[56] References Cited
UNITED STATES PATENTS

| | | | |
|---|---|---|---|
| 3,138,564 | 6/1964 | Bovensky | 260/17 A |
| 3,167,525 | 1/1965 | Thomas | 260/41 B |
| 3,252,788 | 5/1966 | Holik | 75/3 |
| 3,298,979 | 1/1967 | Hagemeyer et al. | 260/17 A |
| 3,370,031 | 2/1968 | Grommers et al. | 260/17 A X |
| 3,455,853 | 7/1969 | Dekking | 260/17 A X |

FOREIGN PATENTS OR APPLICATIONS

| | | | |
|---|---|---|---|
| 533,975 | 12/1956 | Canada | 75/3 |

*Primary Examiner*—A. B. Curtis
*Attorney, Agent, or Firm*—James E. Wolber; Peter Andress

[57] ABSTRACT

Water-soluble graft copolymers of acrylic acid and a water-soluble polyhydroxy polymeric compound, including water-soluble salts thereof, are useful as binders in the agglomeration of finely divided materials. The graft copolymers are especially useful as binders in the pelletization of minerals and ores, such as taconite.

23 Claims, No Drawings

USE OF GRAFT COPOLYMERS AS AGGLOMERATION BINDERS

BACKGROUND OF THE INVENTION

This invention relates to a process for the agglomeration of various types of finely divided materials. More particularly, this invention relates to an improved process for pelletizing metallic minerals and ores resulting in pellets having increased strength and cohesiveness. Still more particularly, this invention relates to the use of water-soluble graft copolymers of acrylic acid and a water-soluble polyhydroxy polymeric compound, including water-soluble salts thereof, as pelletizing binders in such a process, which graft copolymers produce pellets of such increased strength, cohesiveness and the like that they are attrition resistant and able to withstand mechanical and thermal shock.

The agglomeration of various types of materials is well known. There are many processes of agglomeration and devices for agglomeration. They all have in common the physical upgrading in size, density and uniformity of finely divided materials for better processing, recovery or handling, usually by using a suitable binder.

Agglomeration is commercially used in industries where materials are encountered in a form which is too finely divided for efficient and convenient subsequent processing and/or handling. The material might be encountered in such a finely divided condition because it occurs naturally or is produced in this condition, or because it may have been reduced to this condition for the purpose of or during prior processing. It may be necessary or desirable to agglomerate the finely divided particles into sinters, briquets or pellets for further processing.

The metal refining industry is an industry where agglomeration is especially useful. In many metallurgical operations ore is encountered in a very finely divided condition as a result of being reduced to this condition for the purposes of beneficiation. Typical of such an ore is taconite, a very low-grade iron-containing rock which is reduced to a finely divided condition and then subjected to a beneficiation procedure in order to concentrate the iron and to make available an ore of the required richness for conventional blast furnace operation. Unless the taconite which is obtained from the beneficiation process is converted into pellets, the finely divided ore presents many dust problems in handling and may be blown out of the blast furnace by the air and combustion products sweeping up through the flue of the blast furnace. The same result would occur through the use of flue dust, which, while it could be collected and reused, nevertheless in subsequent reuse without being pelletized would again be lost through the flue. In other metallurgical operations on other ores similar difficulties may be present which make it desirable or necessary to have the ore present in the form of pellets even though it may have been in a very finely divided form in its preceding processing.

Therefore, while the instant invention is applicable to the agglomeration of a number of different types of finely divided materials, it will be described with reference to taconite pelletizing for the purpose of illustration. In taconite processing the finely divided ore is converted into pellets which are almost spherical and have a diameter varying from about ½ inch to 1 inch or more. These pellets are formed by agglomerating wet taconite in a suitable device, such as by rolling in a balling drum, and the pellets thus formed are then sintered in a furnace. The pellets become weaker as a result of being dried out during the sintering operation, and as a result may be crushed by the weight of pellets above them when stored in piles. These crushed pellets produce dust which is very undesirable.

A variety of substances have been used or have been suggested for use as binders in order to give compression or "green" strength to the pellets with concomitant increase in pellet size. Prior art substances such as pickle liquor, lime, starch and other naturally occurring organic materials have been tried with little success. These prior art binders either fail to impart the required green strength to the pellets or commonly fail to increase the pellet size to that sufficient for efficient utilization in the subsequent blast furnace operation.

Another material which has been commonly used as a binder is bentonite, a naturally-occurring clay. The Western or natural sodium bentonitic clays have almost exclusively been used as binders in taconite pelletizing since it has been found that these clays produce pellets which are superior to the pellets produced when native or sub-bentonitic clays are used. The difference in the properties imparted to the pellets is apparently due to differences in the chemical and mineralogical compositions of the clay. Sub-bentonitic clays are generally calcium or magnesium varieties of montmorillonite and may contain substantial proportions of non-clay or non-montmorillonite impurities. The bentonitic clays are natural sodium clays and are sometimes hereinafter referred to as merely "bentonitic" clays.

The use of clay as a binder for taconite pellets suffers from the disadvantage of adding silica to the pellets. This silica, the major chemical component of all bentonites, creates large amounts of unusable and deleterious slag in the blast furnace operation. It, therefore, becomes necessary to use a calcium carbonate-containing material, preferably limestone, as a flux to remove the silica contained in the bentonite during the blast furnace operation. Another disadvantage in the use of clay as a binder is that it is generally necessary to use a Western or natural sodium bentonitic clay. This limitation on the type of useful clay presents a disadvantage in areas where the sub-bentonitic type of clay is more economically available.

It would, therefore, be an advantage to the art if a binder could be introduced into the finely divided taconite to be pelletized so as to promote pellet nucleation, allow a rapid pelletization, and impart a green or compression strength to the formed pellets to allow considerable physical handling without breakdown in pellet size or shape. Another advantage would be realized if this binder could be used in combination with a Western bentonite so as to reduce the quantity of clay required. Still another advantage would be realized if this binder could be used in combination with a native or sub-bentonitic clay in order to make a clay, which was heretofore unacceptable for use as a binder, a satisfactory binder.

SUMMARY OF THE INVENTION

This invention is based on the discovery that water-soluble graft copolymerization products of acrylic acid and a minor amount of a substrate which is a water-soluble polyhydroxyl-containing polymeric material, and water-soluble salts thereof, are eminently useful in the agglomeration of finely divided materials. The graft copolymers of this invention may be used either as the sole binder or in combination with bentonite type clays of both the Western or bentonitic and native or sub-bentonitic types. The graft copolymers and clay combinations are especially useful as binders in the agglomeration of finely divided materials such as iron ores, with which clays have heretofore been used as binders. When used in combination with the bentonite type clays, the graft copolymers are effective to reduce the quantity of clay required and/or to enhance the effectiveness of the clay as a binder.

Therefore, in one aspect the present invention is directed to a method of agglomerating finely divided particles using a binder comprising a water-soluble graft copolymer of acrylic acid with a polyhydroxy polymeric compound, including water-soluble salts thereof, and the resulting agglomerates.

In another aspect, the present invention is directed to a method of producing agglomerates of finely divided particles using a binding amount of a water-soluble graft copolymer of acrylic acid with a polyhydroxy polymeric compound, including water-soluble salts thereof, or a combination of such a copolymer and a bentonite type clay, and the resulting agglomerates.

In still another aspect, the present invention is directed to a method of pelletizing finely divided particles of a mineral or ore such as taconite using a binding amount of a bentonite type of clay and a water-soluble graft copolymer of acrylic acid with a polyhydroxy polymeric compound, including water-soluble salts thereof, said graft copolymer being present in an amount sufficient to produce pellets which have a greater strength and cohesiveness than if the clay alone were used, and the resulting pellets.

In a further aspect, the present invention is directed to a method of pelletizing finely divided particles of a mineral or ore such as taconite using a binder consisting essentially of a water-soluble graft copolymer of acrylic acid with a polyhydroxy polymeric compound, including water-soluble salts thereof, and a native or sub-bentonitic clay, said graft copolymer being present in an amount sufficient to enhance the effectiveness of the clay as a binder, and the resulting pellets.

In a still further aspect, the present invention is directed to a method of pelletizing finely divided particles of a mineral or ore such as taconite using a binder consisting essentially of a Western bentonite (natural sodium bentonitic clay) and a water-soluble graft copolymer of acrylic acid with a polyhydroxy polymeric compound, including water-soluble salts thereof, and the resulting pellets.

One important advantage in the use of the graft copolymers, either alone or in combination with clay, in the agglomeration of finely divided material is that the water content of the mixture to be agglomerated is generally less critical than it has heretofore been. For example, the water content of a graft copolymer-clay binder composition for pelletizing taconite is less critical and may vary over a wider range than when clay alone is used.

DESCRIPTION OF THE PREFERRED EMBODIMENTS

The graft copolymers of this invention are useful as binders, either alone or in combination with a bentonite type clay, in processes for the agglomeration of a wide variety of finely divided materials. The material to be pelletized in accordance with this invention may be almost any type of metallic mineral or ore. For example, the predominant metal constituent may be lead, copper, nickel, zinc, uranium, iron, and the like. Mixtures of the above metals or any other metal occurring in the free or molecularly combined natural state as a mineral, or any combination of the above, or other metals which are capable of pelletization may be agglomerated in accordance with this invention. Particularly effective results are realized in the pelletization of minerals predominantly containing iron. The material to be pelletized may contain iron ore deposits coming directly from the mining site, from ore "tailings," flue dust, cold and hot finds from a sinter process, or iron ore which is found in a sludge condition as aqueous iron ore concentrates from natural sources or recovered from various processes. Any one of these sources of iron or any possible combination thereof may be employed according to their availability and particular process set-up of the pelletizing unit. Iron ore or any of a wide variety of the following minerals may form a part of the material to be pelletized: magnetite, hematite, limonite, goethite, siderite, franklinite, ilmenite, chromite, pyrite, and the like.

Minerals other than metallic minerals which may be agglomerated in accordance with this invention include phosphate rock, limestone, talc and dolomite. Still other materials which may be agglomerated in accordance with this invention are fertilizer materials, such as potassium sulfate, potassium chloride and the double sulfate of potassium and magnesium; magnesium oxide; animal feeds such as calcium phosphates; carbon black; coal fines; sodium bisulfate; catalyst mixtures; refractory gunning mixes; glass batch mixes; tungsten carbide; and antimony.

The material to be agglomerated is desirably about 90 percent −100 mesh. Finely divided material having a size of about 90 percent −200 mesh is most appropriate for the practice of this invention, but material as small as about 90 percent −325 mesh can be employed.

The graft copolymers which are useful in the method of this invention are water-soluble graft copolymers prepared by copolymerizing acrylic acid with a minor amount of a polyhydroxy polymeric compound substrate other than methyl cellulose, and water-soluble salts thereof. The amount of the polyhydroxy polymeric compound which is reacted with acrylic acid may vary between about 0.1 and about 10.0 percent, preferably between about 0.25 and about 5.0 percent, based on the total weight of the acrylic acid used.

The substrates which are co-reacted with the acrylic acid to produce the useful graft copolymers are water-soluble polyhydroxyl-containing polymeric compounds. In general, these polymeric compounds may be characterized as having a molecular weight greater than about 350 and containing at least about 5 percent free hydroxyl groups. The polymeric compounds may contain up to 30 percent and even higher free hydroxyl groups. It will be evident that the polyhydroxy polymeric compounds may contain substituents other than hydroxyl groups so long as the substituents are inert, i.e., non-reactive with the acrylic acid, under the reaction conditions. Examples of substituents other than mere hydroxyl groups which the polymeric compounds may contain are halo, alkyl, aryl, carboxyalkyl, hydroxyalkyl, halohydroxyalkyl, arylhydroxyalkyl, and the like.

The useful polymeric substrates include water-soluble polysaccharides and polyhydroxyl-containing derivatives thereof. Although disaccharides and trisaccharides may be used in accordance with this invention, the preferred polymeric compounds are the tetra-, penta- and higher polysaccharides and oligosaccharides, i.e., saccharides containing at least four linked monosaccharide molecules, and derivatives thereof containing substituents such as hereinbefore defined. The most preferred substrates include derivatives of cellulose and the biochemically-synthesized heteropolysaccharides.

Some of the specific polymeric polyhydroxy compounds that may be used as substrates to prepare the novel copolymers of this invention include, but are not limited to, water soluble derivatives of cellulose such as chlorohydroxypropyl cellulose, phenylhydroxyethyl cellulose, hydroxybutyl cellulose, hydroxyethyl cellulose, ethyl cellulose, hydroxyethyl methyl cellulose, hydroxypropyl methyl cellulose, carboxymethyl cellulose and the like cellulose ethers. Other polymeric compounds which may be co-reacted with acrylic acid in accordance with this invention include starch and water-soluble derivatives of starch, e.g., chlorohydroxypropyl starch, phenylhydroxyethyl starch, hydroxybutyl starch, methyl starch, ethyl starch, hydroxyethyl starch, hydroxyethyl methyl starch, hydroxypropyl methyl starch, and carboxymethyl starch. Still other polymeric materials which may be used include the so-called "sugars" such as sucrose, maltose, lactose, raffinose, stachyose and vertascose; causticized lignite; biochemically-synthesized heteropolysaccharides, e.g., produced by the action of bacteria of the genus Xanthomonas or the genus Arthrobacter on carbohydrates; polyvinyl alcohol; and polyalkylene glycols and derivatives thereof such as alkoxy polyalkylene glycols, e.g., polyethylene glycols and methoxy polyethylene glycols. It will be apparent to one skilled in the art that useful compounds include those compounds which will form the above-defined polymeric compounds in the acidic reaction medium and such compounds are included in the scope of this invention. For example, carboxymethyl cellulose will be formed from the sodium salt thereof in the acidic reaction medium.

The graft copolymerization can be carried out by using well-known polymerization techniques. Ultraviolet light or any of the well-known peroxygen-type initiators, e.g., peroxide free radical initiators, may be used. The preferred peroxygen-type initiators are hydrogen peroxide and hydroperoxides such as t-butyl hydroperoxide, diisopropylbenzene hydroperoxide, cumene hydroperoxide, 1-phenylethyl hydroperoxide, and the like. Other useful peroxide initiators are diacyl peroxides such as benzoyl peroxide and acetyl peroxide, and dialkyl peroxides such as di-t-butyl peroxide and dicumyl peroxide. Still other useful peroxygen-type initiators include per-salts such as sodium, potassium or ammonium persulfate and sodium perborate; the peresters such as t-butyl peroxyacetate and t-butyl peroxybenzoate; and the peracids such as performic acid, peracetic acid, perbenzoic acid, and peroxylactic acid. If desired, Redox activated systems can be used in accordance with the usual polymerization practices. Thus, sodium bisulfite-potassium persulfate and hydrogen peroxide-ferrous ion systems may be employed. However, the incremental addition of the peroxygen-type initiator is preferred when a Redox activated system is utilized.

The quantity of the initiator employed can be varied depending on the reaction temperature and other conditions, but will ordinarily be from about 0.0005 to about 0.01 percent, preferably from about 0.002 to about 0.004 percent, based on the weight of the acrylic acid.

The temperature of the reaction is not critical and may vary between about −5°C. and about 100°C. The preferred temperature range is between about 40°C. and about 80°C., with a temperature between about 60°C. and about 70°C. being most preferred. The reaction may be carried out under superatmospheric pressure or even under partial vacuum. However, it is preferred to utilize atmospheric pressure for convenience since the reaction runs very favorably at this pressure.

The graft copolymerization reaction is carried out in an acidic aqueous medium. The pH of the reaction medium may be any value up to and including about 3.5. It is preferred to maintain the pH between about 3.0 and about 3.5 for optimum results. In the event the amount of acrylic acid utilized is not sufficient to lower the pH of the reaction medium to a value of 3.5 or lower, the desired pH may be obtained by the addition of a suitable mineral acid such as sulfuric acid, nitric acid or hydrochloric acid.

The reactants and the initiator are combined in the aqueous reaction medium in any conventional manner. However, the initiator should not be added to the reaction medium containing only the acrylic acid since this could cause the polymerization of the acrylic acid in the absence of the polyhydroxy polymeric compound substrate. As illustrative of a suitable manner of combining the reactants, the acrylic acid and polyhydroxy polymeric compound are each dissolved in separate amounts of water so as to provide homogeneous solutions thereof. These solutions are mixed and the initiator is then added to the mixed solution. Alternatively, the polyhydroxy polymeric compound may be dissolved in water to provide a homogeneous solution to which the acrylic acid and the initiator are added. Other methods of combining the reactants and initiator will be obvious to one skilled in the art. Optimum results will be obtained if the polyhydroxy polymeric compound is thoroughly dissolved in at least a part of the aqueous reaction medium before it is combined with the acrylic acid. Stirring or shaking of the reaction mixture will facilitate the polymerization and result in more uniform polymers.

The reaction time will vary according to the reaction temperature and/or quantity of the initiator present. In general, the time should be sufficient to consume at least 95 percent of the acrylic acid. To illustrate the variance of the reaction time at different temperatures, polymerization was evident in about 5 to 7 hours when acrylic acid was reacted at 60°C. with about 1.0 percent by weight of carboxymethyl cellulose, based on the weight of the acrylic acid, and 0.002 percent by weight of hydrogen peroxide, based on the weight of acrylic acid, was present. On the other hand, polymerization was complete in about 15 to 20 minutes when the reaction was carried out at 100°C. using the same relative amounts of the reactants and the initiator. Polymerization may be detected by a change in refractive index, and completion of the reaction may be detected by the absence of the distinctive odor of acrylic acid.

At the completion of the polymerization reaction, the copolymer thus produced may be converted to the salt form. This conversion is generally effected by neutralization with an appropriate hydroxide. Alkali metal or ammonium salts of the copolymers such as sodium, potassium and lithium salts may be obtained by reacting the copolymers with the corresponding hydroxide. Where complete neutralization is desired, a stoichiometric amount, and preferably a slight excess, of the hydroxide is used. Partial salts may, of course, be produced by using less than the quantity of alkali metal or ammonium hydroxide to effect complete conversion of the carboxyl groups.

The copolymers, in either the acid form or the salt form, may be converted to a dry form if so desired. This may be accomplished by conventional techniques, such as by heating the aqueous solution of the copolymer in a drum drier at a temperature of about 105°C. to drive off the water and yield a dry polymer.

The graft copolymers may be used in either the acid or salt (e.g., ammonium or alkali metal) form as the sole binder or in combination with a bentonite clay. The combination of the graft copolymer and a clay will be especially useful in the agglomeration of materials such as taconite which have heretofore been agglomerated by the use of clay. Bentonite clays of both the Western or natural sodium bentonitic types and native or sub-bentonitic types may be used. When a sub-bentonitic or calcium montmorillonite type of clay is used, the clay is preferably first treated with an alkali metal compound which is water-soluble, ionizable, and has an ion capable of reacting with calcium to form a water-soluble precipitate. Such compounds include, as for example, alkali metal carbonates, hypophosphates, oxalates, phosphates, silicates, sulfites, and tartrates. Sodium carbonate or soda ash is particularly preferred. The amount of the alkali metal compound employed will be somewhat dependent upon the proportion of calcium montmorillonite in the clay. In general, amounts of from about 0.5 to about 6 percent by weight of the clay will be used. The preferred quantities for treatment are from about 2 to about 4 percent by weight of the clay.

The amount of the graft copolymer or combination of clay and graft copolymer added to the material to be agglomerated will vary according to the particular needs of the agglomerating operation. In general, satisfactory results are obtained when from about 0.002 to about 20 pounds of graft copolymer per ton of material to be agglomerated and from about 0 to about 30 pounds of bentonite per ton of material to be agglomerated are employed.

When the graft copolymer is to be utilized as a sole binder, i.e., when no bentonite is employed, the graft copolymer will generally be used in the amount of from about 0.2 to about 20 pounds per ton of material to be agglomerated. An amount of from about 0.5 to about 5 pounds of graft copolymer per ton of material is preferably used in iron ore pelletization operations, with an amount in the range of from about 1 to about 2 pounds per ton being most preferred.

When the graft copolymer is utilized in combination with a bentonitic clay for agglomerating a mineral or ore such as taconite, the amount of the clay will be indirectly proportional to the amount of graft copolymer utilized. A mixture of from about 0.002 to about 0.15 pound of graft copolymer and from about 8 to about 30 pounds of bentonitic clay per ton of material to be agglomerated will be typical. When the graft copolymers are utilized in combination with a sub-bentonitic clay for agglomerating a mineral or ore such as taconite, the amount of the clay utilized will generally be in the amount of from about 12 to about 30 pounds per ton of material to be pelletized. The amount of the polymer used in combination with the sub-bentonitic clay will be sufficient to enhance the effectiveness of the clay as a binder, which will generally be the amount from about 0.004 to about 0.15 pound per ton of material to be agglomerated.

The only other ingredient required in the process of this invention in addition to the finely divided material to be agglomerated and the graft copolymer (possibly in combination with clay) is water. In general, moisture is required to promote compactness and adhesiveness of the agglomerates so that they may withstand subsequent handling. The water operates in conjunction with the binder to give good binding action. The mixture to be agglomerated will generally contain from about 2 to about 20 percent by weight of water, based on the weight of the finely divided material. A typical moisture content in processes for pelletizing minerals and ores such as taconite will be from about 5 to about 12 percent by weight of water, based on the weight of the material to be pelletized. The water content of a taconite-containing mixture to be agglomerated will preferably be in the range of from about 8.5 to about 10.5 percent by weight of water, based on the weight of the taconite.

When the graft copolymer and clay are used in the process of this invention for the pelletization of iron ore, such as taconite, the mixture to be pelletized may also contain a small amount of flux material chosen from a number of known substances. The presence of this flux material might be desirable to aid in the removal of the silica content of the clay from the metal melt as slag. A calcium carbonate-containing substance is generally employed because of availability and low cost. Among these, limestone or an impure source of limestone such as calcite is suitable.

In the practice of this invention, the graft copolymer may be added to the finely divided material to be agglomerated at any place prior to the agglomeration operation. The components of the agglomeration mixture (i.e., finely divided material, water, graft copolymer and clay, if used in combination with the graft copolymer) may be mixed in any conventional manner and in any order. However, as hereinbefore pointed out, it is preferred that any alkali metal compound such as soda ash be added to the clay before the clay is combined with any of the other components of the agglomeration mixture when a sub-bentonitic clay or calcium bentonite is used. In addition, when iron ore is pelletized in accordance with this invention, the graft copolymers are preferably not combined with the iron ore until just prior to the agglomeration operation. The effectiveness of the graft copolymers as a binder might deteriorate if the graft copolymers are admixed with the iron ore for a substantial period of time, e.g., 8 hours, prior to the agglomeration operation.

Suitable methods for combining the components of the agglomeration mixture will be readily apparent to one skilled in the art. For example, the graft copolymer may be mixed in a dry finely divided form with the finely divided material to be agglomerated (and the clay, if used) to form a composition to which only the correct amount of water need be added. Inasmuch as the graft copolymers are water-soluble in both the acid and salt forms, they may be added in an aqueous solution to the dry finely divided material to be agglomerated. In still another alternative method of combining the components of the agglomeration mixture, the acid or salt form of the graft copolymer may be added in the dry form or in an aqueous solution to clay before the clay is combined with the finely divided material. When an aqueous solution of the graft copolymer is utilized, the concentration of the solution may be adjusted to yield an agglomeration mixture of the desired total moisture content.

Intermixture of the components of the agglomeration mixture may be performed by hand, in an internal mixer, in a paddle type mixer, or in a mulling machine. No particular care as to time and temperature of mixing need be exercised.

No criticality is claimed in the utilization of a particular type of agglomerating apparatus, and any of the wellknown types of agglomerating devices may be used in the process of this invention. For example, the agglomeration may be carried out by a disc or drum pelletizer. This device, which is especially useful in the pelletization of minerals and ores such as taconite, comprises a rotating inclined surface which agglomerates the mixture into pellets while flowing upon the revolving inclined surface. Multiple-cone drum pelletizers are particularly desirable. Other types of agglomerating devices useful in the process of this invention are pug mills, compacting and granulating mills, extruders, and the like.

The agglomeration mixture charged to the agglomerating device will then be formed into balls or pellets of the desired size. For example, in the pelletization of taconite, the agglomeration mixture is charged to a disc or drum pelletizer which is operated to produce balls or pellets having a size of about one inch diameter. The resulting balls or pellets are then removed from the pelletizer and fed to a drying oven where they are dried to a maximum moisture content of about 0.2 percent.

The following non-limiting examples will serve to further illustrate this invention.

EXAMPLE I

In an experiment which is conducted to demonstrate the effectiveness of the graft copolymers of this invention as a sole binder for finely divided materials, a hematite iron ore concentrate having a particle size of about 90 percent minus 325 mesh is blended in a mulling machine and shredder with 10 percent by weight of water and 0.075 percent by weight of a sodium salt of an acrylic acid-carboxymethyl cellulose graft copolymer which is produced as outlined above. Pellets are made by rolling the mixture in a 16 inch drum at 53 r.p.m. or 225 lineal feet per minute. A handful of the mixture is first rolled until "seeds" or small pellets are formed. A small amount of water is added to the pelletizer to aid the growth of these seeds. The contents of the pelletizer are then removed and screened to minus 5, plus 4 mesh. The seeds are returned to the drum and rolled with more of the agglomeration mixture to build the seeds to pellet size. The agglomeration mixture is fed to the pelletizer at a rate to build the seeds to pellet size in about three minutes. The pellets are removed from the pelletizer and screened to minus 0.525, plus 0.5 inch, and the screened pellets are then tested.

The average moisture content of the product pellets is determined by weighing 15 of the pellets, and then drying them at about 130°C. for 10 minutes. The dried pellets are reweighed and the percent moisture of the pellets is calculated.

The dry compression strength is determined by testing 10 of the 15 dry pellets for crushing with a modified Harry W. Dietert Company sand-strength testing machine. The scale is read at the point of fracture of each pellet, and the average of the 10 readings is multiplied by a correction factor of pi (3.141).

The green compression strength of the pellets is determined by testing 10 green pellets from the screened product of the pelletizer in the method outlined above for testing the dry compression strength.

The "Drop Number" of the pellets is determined by dropping 10 green pellets obtained from the screened product of the pelletizer from a height of 18 inches upon a hard surface. These pellets are dropped until they break and the average of the number of drops of the pellets is determined.

The results of this experiment show that the graft copolymers of this invention are very effective binding agents in the agglomeration of finely divided material. The pellets exceed the specification minimums commonly used in the taconite industry for pellet properties using a binder of 12 pounds of sodium bentonite per ton of taconite, which are as follows:

| | |
|---|---|
| Green Compression Strength | 2–3 p.s.i. |
| Dry Compression Strength | 8–10 p.s.i. |
| Drop Number | 6–8 |

EXAMPLE II

In another series of experiments conducted to demonstrate the usefulness of the graft copolymers of this invention as binders in combination with clay, the procedure outlined in Example I is followed, except that the sodium salt of an acrylic acid-carboxymethyl cellulose graft copolymer is used in the amount of 0.012 pound per ton of concentrate in combination with a Western bentonite. The bentonite is used in the amount of 8 pounds per ton of concentrate (0.4 percent by weight) which is the two-thirds of the amount commonly used for bentonite evaluation in the taconite industry. In addition, a blank using the clay without any graft copolymers is run at this clay amount. The results of this series of experiments clearly demonstrate the usefulness of the graft copolymers in combination with a Western bentonite as a binder. The pellets which are produced by using the copolymer in combination with the clay are superior to the pellets produced when the Western bentonite is used alone. In addition, the pellets which are produced using the combination of the copolymer and clay exceed the minimum specifications of the taconite industry for when clays are used in the amount of 12 pounds per ton of taconite.

EXAMPLE III

The procedure of Example II is again followed except that 0.6 percent by weight of a 5 percent soda ash-treated calcium bentonite is employed alone and in combination with the copolymer which is used in Example II. In this experiment the graft copolymer is used in the amount of 0.018 pound per ton of concentrate. The pellets which are produced from the graft copolymer-containing polymerization mixture are superior to the pellets produced when the polymer isn't present. The pellets produced in accordance with this invention exceed the aforementioned specification minimums whereas the pellets which are produced by using only the clay do not have a sufficient drop number.

Although this invention has been described in relation to specific embodiments, it will be apparent that obvious modifications may be made by one skilled in the art without departing from the intended scope of this invention as defined by the appended claims.

What is claimed is:

1. In a method of agglomerating a wetted mass of a finely divided material, the improvement which comprises the step of adding to said wetted mass, prior to the agglomeration thereof, at least a binding amount of a water-soluble graft copolymer or a mixture of said graft copolymer and a bentonite clay, said graft copolymer being a graft copolymerization product of acrylic acid and from about 0.1 to about 10 percent by weight, based on the weight of said acrylic acid, of a polyhydroxy polymeric compound, or a water-soluble salt of said graft copolymerization product, said polyhydroxy polymeric compound being of the group consisting of:
   a. derivatives of cellulose of the group consisting of chlorohydroxypropyl cellulose, phenylhydroxyethyl cellulose, hydroxybutyl cellulose, hydroxyethyl cellulose, ethyl cellulose, hydroxyethyl methyl cellulose, hydroxypropyl methyl cellulose, and carboxymethyl cellulose,
   b. starch,
   c. derivatives of starch of the group consisting of chlorohydroxypropyl starch, phenylhydroxyethyl starch, hydroxybutyl starch, hydroxyethyl starch, ethyl starch, hydroxyethyl methyl starch, hydroxypropyl methyl starch, carboxymethyl starch, and methyl starch,
   d. sugars,
   e. causticized lignite,
   f. biochemically-synthesized heteropolysaccharides,
   g. polyvinyl alcohol,
   h. polyalkylene glycols, and
   i. alkoxy polyalkylene glycols.

2. A method in accordance with claim 1 wherein said graft copolymerization product is an ultraviolet light or peroxygen-type compound induced graft copolymerization product, and from about 0.002 to about 20 pounds of said graft copolymer per ton of said material and from 0 to about 30 pounds of a bentonite clay per ton of said material is added to said wetted mass.

3. A method in accordance with claim 2 wherein said graft copolymerization product is a peroxide free radical induced graft copolymerization product of acrylic acid and from about 0.25 to about 5 percent by weight, based on the weight of said acrylic acid, of said derivative of cellulose or said biochemically-synthesized heteropolysaccharide, and said wetted mass contains from about 2 to about 20 percent by weight of water, based on the weight of said material.

4. A method in accordance with claim 3 wherein said material is a mineral.

5. A method in accordance with claim 4 wherein said bentonite clay is a bentonitic clay.

6. A method in accordance with claim 4 wherein said bentonite clay is a sub-bentonitic clay.

7. A method in accordance with claim 6 wherein said bentonite clay is a soda ash treated sub-bentonitic clay.

8. A method in accordance with claim 4 wherein from about 0.5 to about 5 pounds of said graft copolymer per ton of said material is added to said wetted mass.

9. A method in accordance with claim 3 wherein from about 0.2 to about 20 pounds of said graft copolymer per ton of said material, but no clay, is added to said wetted mass.

10. A method in accordance with claim 9 wherein said graft copolymerization product is a hydrogen peroxide or hydroperoxide induced graft copolymerization product of acrylic acid and carboxymethyl cellulose.

11. A method in accordance with claim 9 wherein said material is an iron ore and said wetted mass contains from about 5 to about 12 percent by weight of water, based on the weight of said material.

12. A method in accordance with claim 11 wherein said material is taconite.

13. A method in accordance with claim 11 wherein from about 0.002 to about 0.15 pound of said graft copolymer per ton of said material and from about 8 to about 30 pounds of a bentonitic clay per ton of said material is added to said wetted mass.

14. A method in accordance with claim 11 wherein from about 0.004 to about 0.15 pound of said graft copolymer per ton of said material and from about 12 to about 30 pounds of a soda ash-treated sub-bentonitic clay per ton of said material is added to said wetted mass.

15. A method in accordance with claim 11 wherein said finely divided material has a size of about 90 percent minus 325 mesh.

16. As a composition of matter, an agglomerate of finely divided material held together by a binder comprising a water-soluble graft copolymer or a mixture of said graft copolymer and a bentonite clay, said graft copolymer being a graft copolymerization product of acrylic acid and from about 0.1 to about 10 percent, based on the weight of said acrylic acid, of a polyhydroxy polymeric compound, or a water-soluble salt of said graft copolymerization product, said polyhydroxy polymeric compound being of the group consisting of:
   a. derivatives of cellulose of the group consisting of chlorohydroxypropyl cellulose, phenylhydroxyethyl cellulose, hydroxybutyl cellulose, hydroxyethyl cellulose, ethyl cellulose, hydroxyethyl methyl cellulose, hydroxypropyl methyl cellulose, and carboxymethyl cellulose,
   b. starch,
   c. derivatives of starch of the group consisting of chlorohydroxypropyl starch, phenylhydroxyethyl starch, hydroxybutyl starch, hydroxyethyl starch, ethyl starch, hydroxyethyl methyl starch, hydroxypropyl methyl starch, carboxymethyl starch, and methyl starch,
   d. sugars,
   e. causticized lignite,
   f. biochemically-synthesized heteropolysaccharides,
   g. polyvinyl alcohol,
   h. polyalkylene glycols, and
   i. alkoxy polyalkylene glycols.

17. A composition of matter in accordance with claim 16 wherein said graft copolymerization product is an ultraviolet light or peroxygen-type compound graft copolymerization product, and containing from about 0.002 to about 20 pounds of said graft copolymer per ton of said material and from about 0 to about 30 pounds of said bentonite clay per ton of said material.

18. A composition of matter in accordance with claim 17 wherein said graft copolymer is a peroxide free radical induced graft copolymerization product of acrylic acid and from about 0.25 to about 5 percent by weight, based on the weight of said acrylic acid, of said derivative of cellulose or said biochemically-synthesized heteropolysaccharide, and water is present in the amount of from about 5 to about 12 percent by weight, based on the weight of said material.

19. A composition of matter in accordance with claim 18 wherein said finely divided material is an iron ore.

20. A composition of matter in accordance with claim 19 wherein said agglomerate is held together by from about 0.5 to about 5 pounds of said graft copolymer per ton of said material.

21. A composition of matter in accordance with claim 19 wherein said agglomerate is held together by from about 0.002 to about 0.15 pound of said graft copolymer per ton of said material and from about 8 to about 30 pounds of a bentonitic clay per ton of said material.

22. A composition of matter in accordance with claim 19 wherein said agglomerate is held together by from about 0.004 to about 0.15 pound of said graft copolymer per ton of said material and from about 12 to about 30 pounds of a soda ash treated sub-bentonitic clay per ton of said material.

23. A composition of matter in accordance with claim 19 wherein said graft copolymerization product is a hydrogen peroxide or hydroperoxide induced graft copolymerization product of acrylic acid and carboxymethyl cellulose.

* * * * *